(Specimens.)
2 Sheets—Sheet 1.
W. WEST.
PROCESS OF TREATING ZINC ORES.
No. 444,997. Patented Jan. 20, 1891.
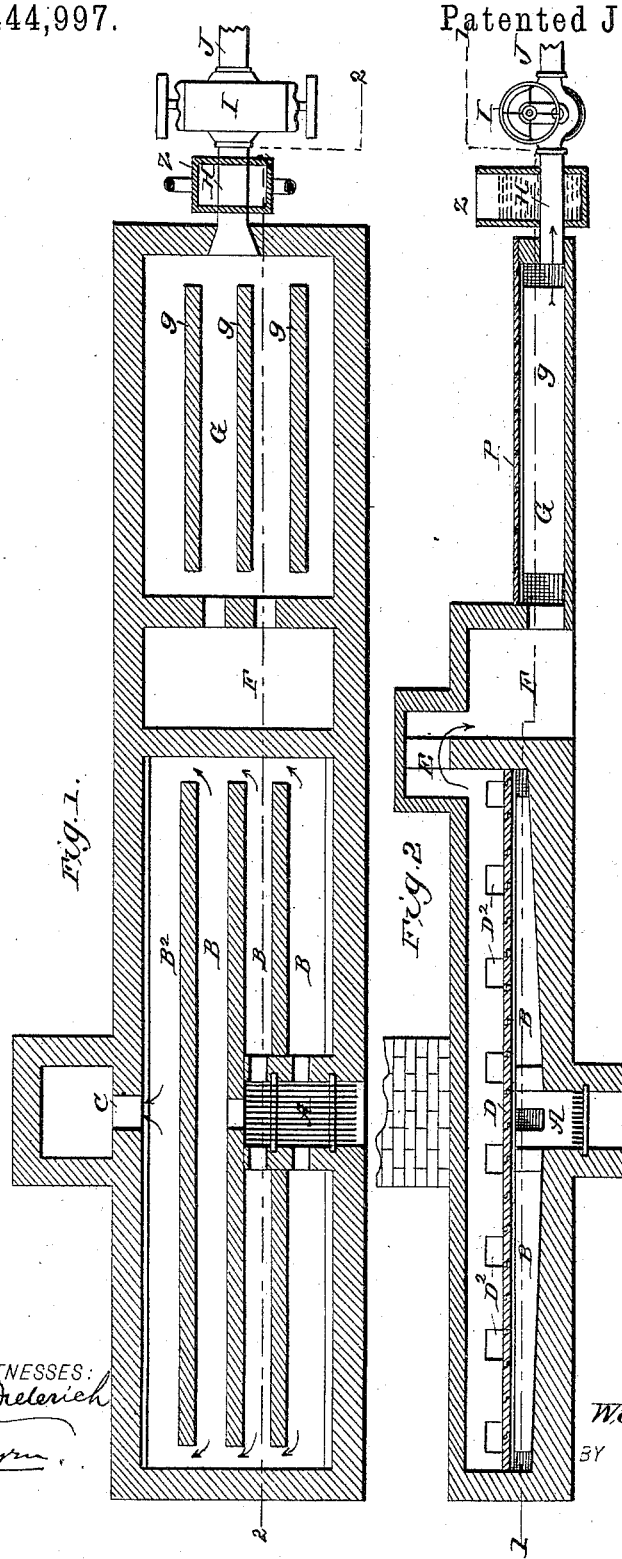
WITNESSES:
INVENTOR:
William West.
BY Munn & Co
ATTORNEYS (Specimens.)
W. WEST.
PROCESS OF TREATING ZINC ORES.
No. 444,997. Patented Jan. 20, 1891.
2 Sheets—Sheet 2.
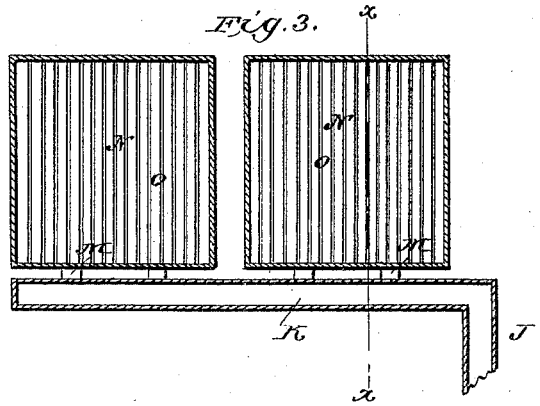
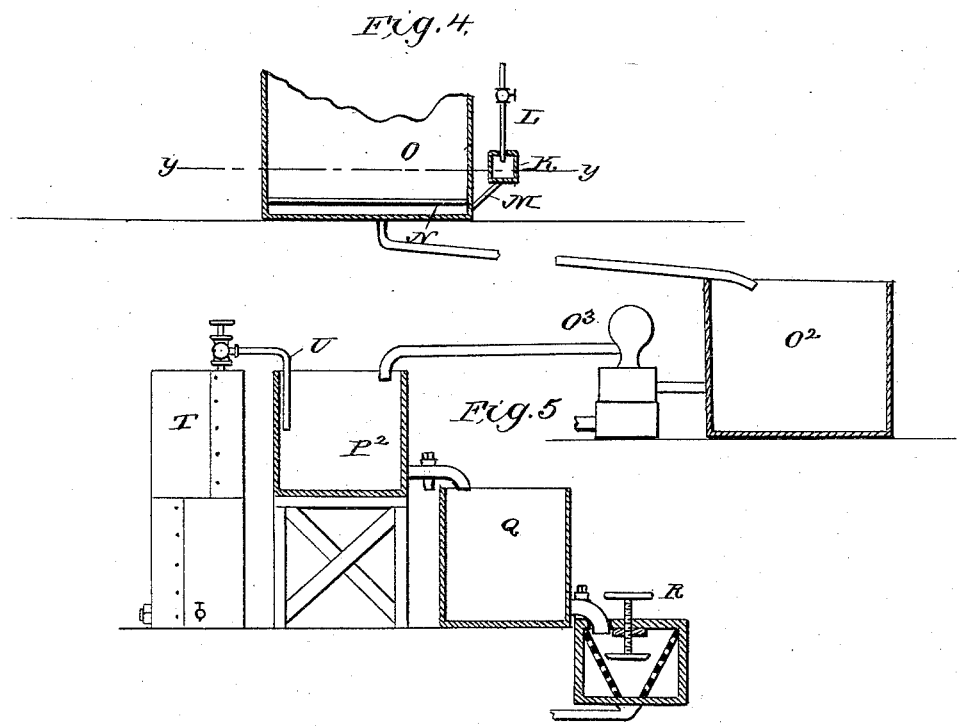
WITNESSES:
Fred G. Dieterich
Edw. W. Byrn.
INVENTOR:
William West.
BY
ATTORNEYS

UNITED STATES PATENT OFFICE.

WILLIAM WEST, OF DENVER, COLORADO, ASSIGNOR OF ONE-HALF TO JOSEPH E. CLEMONS, OF SAME PLACE.

PROCESS OF TREATING ZINC ORES.

SPECIFICATION forming part of Letters Patent No. 444,997, dated January 20, 1891.

Application filed December 13, 1889. Serial No. 333,608. (Specimens.)

*To all whom it may concern:*

Be it known that I, WILLIAM WEST, of Denver, in the county of Arapahoe and State of Colorado, have invented a new and Improved Process of Treating Zinc Ores, of which the following is a specification.

There are in many parts of this country, especially in the West and South, large bodies of mineral composed of zinc and lead sulphides carrying gold and silver with more or less iron, which ores are almost valueless from the presence of zinc. The smelting for silver is difficult in the case of this combination, and the lead hinders the use for smelting for zinc. Many schemes have been devised to save the metals zinc, lead, gold, and silver.

My invention consists in a new process for working these ores, whereby the zinc is separated and recovered from the other metals as a sulphite in a single economical operation and the remaining metals left in good condition for further treatment.

Figure 1 is a horizontal section on line 1 1 of Fig. 2 of a furnace and connections with the pressure-blower, which exhausts the gas from the furnace and forces it to the ore-tanks. Fig. 2 is a vertical longitudinal section of the same through the line 2 2 of Fig. 1. Fig. 3 is a horizontal section through line $y$ $y$ of Fig. 4 of two tanks and their connections for treating the roasted ore with the gas. Fig. 4 is a vertical section of the same through the line $x$ $x$ of Fig. 3, and Fig. 5 is a vertical sectional view of the precipitating apparatus.

A is the fire-place in the center of the furnace. B are the flues which carry the heat of the fire under the tile bed D, upon which the ore is placed. The fire passes each way under the bed by the front flues B and returns by the back flues $B^2$ to the outlet-flue C, which leads to the chimney-stack. The furnace-bed D, which is made of flanged tiles, has working-doors, (marked $D^2$,) through which the ore is charged and raked. The sulphurous-acid gas from the ore passing through the flue E enters the dust-chamber F, and from there goes to the flues G, which are covered with iron plates P, thereby forming a drying-floor for the ore after it leaves the leaching-tanks and also a cooling-chamber for the gas. From these flues the gas passes to the pipe or pipes H, leading to the blower, which pipe may be placed in a tank Z of water to further cool the gas before it enters the blower. I is this blower, which exhausts the gas from the furnace and forces it to the ore-tanks. From the blower the gas enters the pipe J, leading to the trunk K, Fig. 3. A steam-pipe L is connected to this part, through which steam is forced into and mixes with the gas in the trunk K. From the trunk K are short pipes M, which convey the steam and gas under the false bottom N in the tanks O, where the ore is dampened and placed to be treated. The temperature at which the gas enters the false bottom of tank O must not be higher than 180° Fahrenheit, being reduced to this degree by passage under the drying-floor P through the cooling-tank Z when used and through the pipe J, which latter allows much of the heat of the gas to escape by radiation. When the ore is sufficiently acted upon, I immediately subject the ore to treatment with water at a temperature less than 180° Fahrenheit, which water is run upon the ore and the soluble sulphite of zinc is leached out into a tank $O^2$ below the floor. The liquor after settling in the settling-tank is delivered by pump $O^3$ to tank $P^2$, Fig. 5, where a stream of ammonia-gas from still T through pipe U precipitates the zinc as hydrated oxide. The liquor in which the zinc is suspended is then run off into tank Q, where the hydrated zinc oxide deposits. The ammonia solution is siphoned off and sent back to still T to be liberated by the use of lime and used on the next charge of zinc solution. R is a filter-press to free the hydrated zinc oxide of the ammoniacal liquor. The hydrated zinc oxide is then dried and smelted in the ordinary way to metallic form.

The furnace herein described I do not claim in this application, as I have claimed the same in another application filed November 30, 1889, Serial No. 332,102. In operating my process with this apparatus a charge of ground ore is first placed upon the tile hearth D and the ore roasted till the zinc is in the form of oxide. When the raw ore is placed upon the tile hearth D, it is generally of about the following composition: silica, twelve per cent.; lead, fourteen per cent.; zinc, twenty-six to thirty per cent; iron, twelve to fifteen per cent., and as the metals are all in the state of sulphides there is from twenty-seven to thirty per cent. of sulphur. The effect of the roasting upon these ingredients is to convert the iron and zinc into oxides with a very slight loss of zinc, the proportion of zinc remaining being reduced to about twenty-three per cent., which involves only about the usual loss of three to seven per cent. The lead remains as partly-converted oxide and partly-unacted-upon sulphide. The above describes as nearly as possible the condition of the charge when it leaves the furnace. This charge is then removed and placed upon the false bottom N of tanks O and dampened. A new charge of ore is then placed on the hearth D, and while it is being roasted the sulphurous-acid gas is drawn off by the blower, cooled to a temperature below 180° Fahrenheit, and forced at a pressure of about one pound to the inch in connection with steam through the dampened ore in tanks O until the oxide of zinc is converted into soluble sulphite of zinc. The object of the steam is to keep the ore damp enough for chemical action to take place between the gas and the oxide of zinc, and also to keep the ore in a porous condition, so the gas can penetrate it. Care is taken to prevent air from reaching the ore, so as to avoid oxidizing the sulphite of zinc into sulphate. The sulphite of zinc is then removed by successive leachings of warm water. The remaining ore containing the other metals is taken out and put upon the drying-floor P, where the heat of the hot gases in transit serves to dry it for subsequent treatment in separation of the remaining metals. The heat abstracted by this drying of the wet ore also profitably serves to cool the gases as they pass to the blower, and thus prepare them for admission to the leaching-tanks. The charge from the hearth D is then transferred to the tanks O and a new charge placed upon the hearth, and the triple operation of roasting the ore, drying the residual ores of the previous charge, and eliminating the zinc from the roasted ore in tanks O is simultaneously carried on with a great economy of working and very satisfactory results.

In defining my invention with greater clearness I would state that I am aware that it is not new to roast ores of the class I treat and to take off the fumes of sulphurous acid and make an aqueous solution of the same and then to treat the roasted ore to successive leachings with this bulky solution of the gas in water to form a soluble sulphite of zinc. This process involves the use of a very large amount of water with the incident cost of handling, the cost of evaporating so large a bulk of solution, and also the precipitation of a large amount of insoluble matter back upon the ore being leached, as well as the objectionable conversion of a large amount of the sulphurous acid into sulphuric acid by the water during the time required for the successive leachings with the sulphurous-acid solution. All these objections are overcome by my process.

I am also aware of the patent to Ryerson, August 14, 1866, in which sulphurous-acid gas from a charge of roasted ore, in connection with binoxide of nitrogen and steam, is admitted in gaseous form to a roasted charge of ores for the purpose of converting the oxides into sulphates, the commingled gases serving in such case to convert the sulphurous acid into sulphuric acid before converting the oxides into sulphates. This process is not designed for nor applied to the separation of zinc ores, as mine is, and could not separate the zinc from the iron, for the reason that both the oxides of zinc and the iron would be converted into soluble sulphates by the sulphuric acid and all would be leached out together unseparated. By my process the composition of sulphurous acid is preserved without being allowed to reach any higher oxidation, and while this sulphurous acid attacks the zinc oxide and makes a soluble sulphite of zinc it does not form soluble sulphites of the iron, and hence a separation of zinc is at once effected.

I am also further aware of the patent to Baker, March 28, 1865, in which the sulphurous gas is brought into aqueous solution and put upon the roasted ore in tanks, which are placed above the flues through which the hot gases pass. In this case the presence of water and heat together causes the salts that are formed to be sulphates, and this process could not be applied to the separation of zinc even if it were present, for the reasons before given.

I am also further aware of the patent to Mackie, August 29, 1865, in which the ore is reduced to a matte, and is then introduced into a retort and the oxide acted upon by a current of moist air and sulphurous or muriatic acid vapor without reference to the separation of zinc, and I make no claim to such process.

Having thus described my invention, what I claim as new is—

1. The process herein described of eliminating zinc from complex ores, as described, which consists in roasting the ore to form sulphurous-acid gas and oxidize the zinc, then cooling this gas to a temperature of 180° Fahrenheit or below and passing the same in gaseous form in conjunction with steam and without oxidation into sulphuric acid through a previously-roasted charge to form soluble sulphite of zinc, and then immediately leaching out and separating the zinc sulphite with water at a temperature below 180° Fahrenheit, as described.

2. The process herein described of eliminating zinc from complex ores, which consists in roasting the ore, passing the sulphurous-acid gas arising therefrom in conjunction with steam through a previously-roasted charge at a temperature below 180° Fahrenheit to form soluble sulphite of zinc, leaching out the sulphite of zinc with water at a temperature below 180° Fahrenheit, and simultaneously drying the leached ore residuum by the transit of the hot sulphurous-acid gas and thereby cooling said gas, substantially as shown and described.

WILLIAM WEST.

Witnesses:
JAS. FLETCHER, Jr.,
KINNETH C. MYERS.